United States Patent [19]

Dischert et al.

[11] 4,419,687

[45] Dec. 6, 1983

[54] COMPATIBLE COMPONENT DIGITAL SYSTEM

[75] Inventors: Robert A. Dischert, Burlington; Charles B. Oakley, Princeton, both of N.J.

[73] Assignee: RCA Corporation, New York, N.Y.

[21] Appl. No.: 276,958

[22] Filed: Jun. 24, 1981

[51] Int. Cl.³ .................. H04N 5/76; H04N 9/32; H04N 9/491

[52] U.S. Cl. ................................ 358/13; 358/310; 358/314

[58] Field of Search ........... 358/4, 8, 13, 310, 314, 358/315, 316; 360/38, 47

[56] References Cited

U.S. PATENT DOCUMENTS

| | | | |
|---|---|---|---|
| 3,303,482 | 2/1967 | Jenkins | 360/47 |
| 4,250,521 | 2/1981 | Wright | 360/38 |

OTHER PUBLICATIONS

Brown, "Primary Signal Component Coding", Conference Publication 191, 1980 International Broadcasting Convention, pp. 344–349.

Rossi, "Color Decoding a PCM NTSC Television Signal", *Journal of the SMPTE*, Jun. 1974, vol. 83, pp. 489–495.

*Primary Examiner*—Michael A. Masinick
*Attorney, Agent, or Firm*—E. M. Whitacre; W. H. Meise; H. I. Steckler

[57] ABSTRACT

A sampled color video signal is recorded in component form in a plurality of channels. The form of the signal is chosen so that if only one channel is available due to dropouts upon playback, then at least approximate separation into color components is possible, and if all channels are available, then full color separation is possible. The form is also chosen to provide a dynamic range that fits the transmission channel.

13 Claims, 6 Drawing Figures

| PIXEL NO. | 1 | 2 | 3 | 4 |
|---|---|---|---|---|
| CHANNEL NO. 1 | Y+I X | Y+Q X | Y-I X | Y-Q X |
| 2 | 0 Y-I | 0 Y-Q | 0 Y+I | 0 Y+Q |

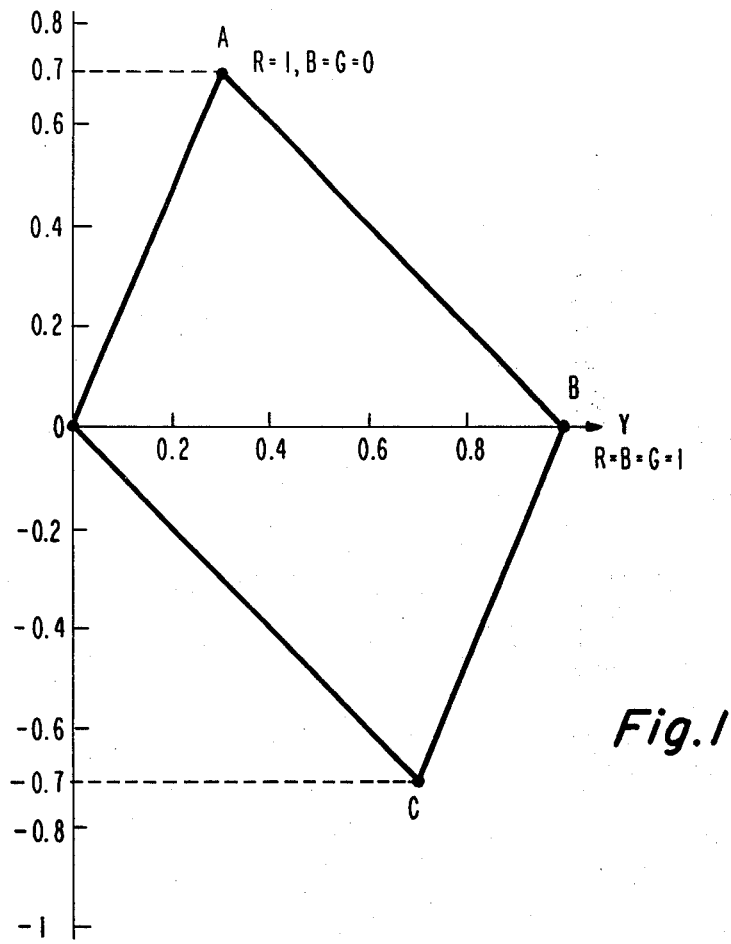
Fig.1
| PIXEL NO. | 1 | 2 | 3 | 4 | 5 | 6 | 7 | 8 |
|---|---|---|---|---|---|---|---|---|
| | Y+I | Y+Q | Y−I | Y−Q | Y+I | Y+Q | Y−I | Y−Q |
Fig.2
| PIXEL NO. | 1 | 2 | 3 | 4 |
|---|---|---|---|---|
| CHANNEL NO. 1 | Y+I X | Y+Q X | Y−I X | Y−Q X |
| 2 | 0 Y−I | 0 Y−Q | 0 Y+I | 0 Y+Q |
Fig.3
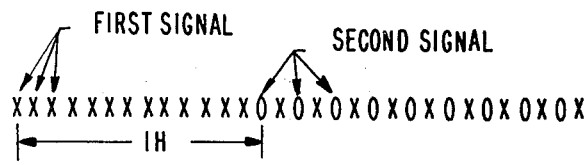
Fig.4

COMPATIBLE COMPONENT DIGITAL SYSTEM

BACKGROUND OF THE INVENTION

The present invention relates to digital systems, and more particularly, to such systems for the transmission or recording of color television component signals.

To record component video signals, the component signals are digitized (sampled and then quantized). The quantized signals are most typically represented using 8-bits each (256 grey levels). The digital bits are then recorded using, e.g. a magnetic recording head proximate a moving magnetic tape. To reproduce the signal, the tape is displaced past a magnetic reproducing head thereby inducing the originally recorded digital signals therein. The digital signals then are converted to analog component signals. If desired the component signals may then be combined to form a composite video signal.

One possible choice for the component signals is R, G, and B (red, green, and blue respectively). However each of the recording channels (one channel for each of the component signals) must then have the full bandwidth of the video signal, e.g. 4.2 MHz for NTSC, in order to achieve a high resolution picture upon reproduction. It is possible to use the principle of "mixed highs" to reduce the required bandwidth in an R, G, B system such as is disclosed in the paper entitled "Primary Signal Component Encoding" by I. G. Brown presented at the 1980 International Broadcasting Convention, conference publication No. 191. Another possibility is to record Y(luminance) and color difference signals, such as R-Y and B−Y or I (inphase) and Q (quadrature) in the three channels respectively. This choice of recorded signals permits using a wideband, e.g. 4.2 MHz, channel for only the Y signal and narrower bandwidth channels for the color difference signals, and therefore is an improvement in this respect over recording the R,G, and B signals but is the same as mixed highs in this respect. However, the dynamic range required in this case is increased over that required for an R,G, and B system.

This is illustrated in FIG. 1, where the horizontal axis represents the Y signal and the vertical axis represents the R−Y color difference signal. To construct the graph the equation $Y=0.1B+0.3R+0.6G$ is used, which is a reasonably accurate approximation and further, it is assumed that the R,G, and B signals each have a normalized dynamic range of 0 to 1. The signal R−Y is equal to $R-(0.1B+0.3R+0.6G)=-0.1B+0.7R-0.6G$. When $R=B=G=0$, both signals R−Y and Y are 0, which is represented by origin point 0 in FIG. 1. When R=1 and B=G=0, then $R-Y=0.1(0)+0.7(1)-0.6(0)=0.7$ and $Y=0.1(0)+0.3(1)+0.6(0)=0.3$ which is represented by point A. When $R=B=G=1$, then $Y=0.1(1)+0.3(1)+0.6(1)=1$ and $R-Y=-0.1(1)+0.7(1)-0.6(1)=0$, which is represented by point B. When R=0 and B=G=1, then $R-Y=-0.1(1)+0.7(0)-0.6(1)=-0.7$ and $Y=0.1(1)+0.3(0)+0.6(1)=+0.7$, which is represented by point C.

The interior area bounded by parallelogram OABC represents all possible combinations of the signals Y and R−Y. It is noted that the required dynamic range for the R−Y signal corresponds to the range of points A to C, which equals $+0.7-(-0.7)=+1.4$ relative to that required for recording R,G and B signals.

A similar diamond shaped figure results when the B−Y signal is graphed versus the Y signal although the exact numbers are different. For example, the signal $B-Y=1B-(0.1B+0.3R+0.6G)=0.9B-0.3R-0.6G$. If at one extreme of the B−Y signal B=1 and R=G=0, then the B−Y signal equals 0.9, while, if at the other extreme B=0 and R=G=1, then $B-Y=-0.3-0.6=-0.9$. Thus the required dynamic range for the B−Y signal is $+0.0(-0.9)=1.8$.

Thus the recording of the Y, B−Y, and R−Y signals requires a larger dynamic range in the color difference channels than recording R,G, and B signals where all channels have a dynamic range of one. A larger dynamic range has the disadvantage in a digital system that more quantizing levels are required for a given quantizing error.

Another problem that occurs in either recording or transmission of signals is that of dropouts, which are a temporary loss of signal information. To overcome this problem, it is customary to separate the information signal into a plurality of channels, the channels being in the case of a tape recording system either a plurality of independent recording tracks or a single track having all channels, but with a time delay therebetween longer than the expected dropout length, such as shown in U.S. patent application Ser. No. 241,925 filed Mar. 9, 1981 in the name of Glenn A. Reitmeier and assigned to the assignee of the present invention. A dropout will most probably affect only one channel, thus allowing the dropout to be concealed using the information in the remaining channels. However, in said application half the pixels (picture elements) are represented in each channel, and therefore the concealment process results in one half the resolution of the original picture signal for the duration of the concealment.

It is therefore desirable to have a signal format that provides a dynamic range that fits the transmission channel and has high dropout concealment capability.

SUMMARY OF THE INVENTION

Method and apparatus for transmitting samples of a color television signal, comprising sequentially transmitting in each of a plurality of channels a separable set of color components of each sample of said television signal, whereby at least approximate separation into color components is possible when only one channel is available due to dropouts, any one channel of said plurality being separable with respect to the remaining channels, whereby complete color separation is possible when all channels are available.

DESCRIPTION OF THE DRAWINGS

FIG. 1 is a graph illustrating dynamic range for one encoding scheme;

FIG. 2 is a diagram showing samples of a composite television signal;

FIG. 3 is a diagram showing the samples of FIG. 2 in a recording format in accordance with the present invention;

FIG. 4 illustrates an alternate recording format;

DETAILED DESCRIPTION

Figure 5:
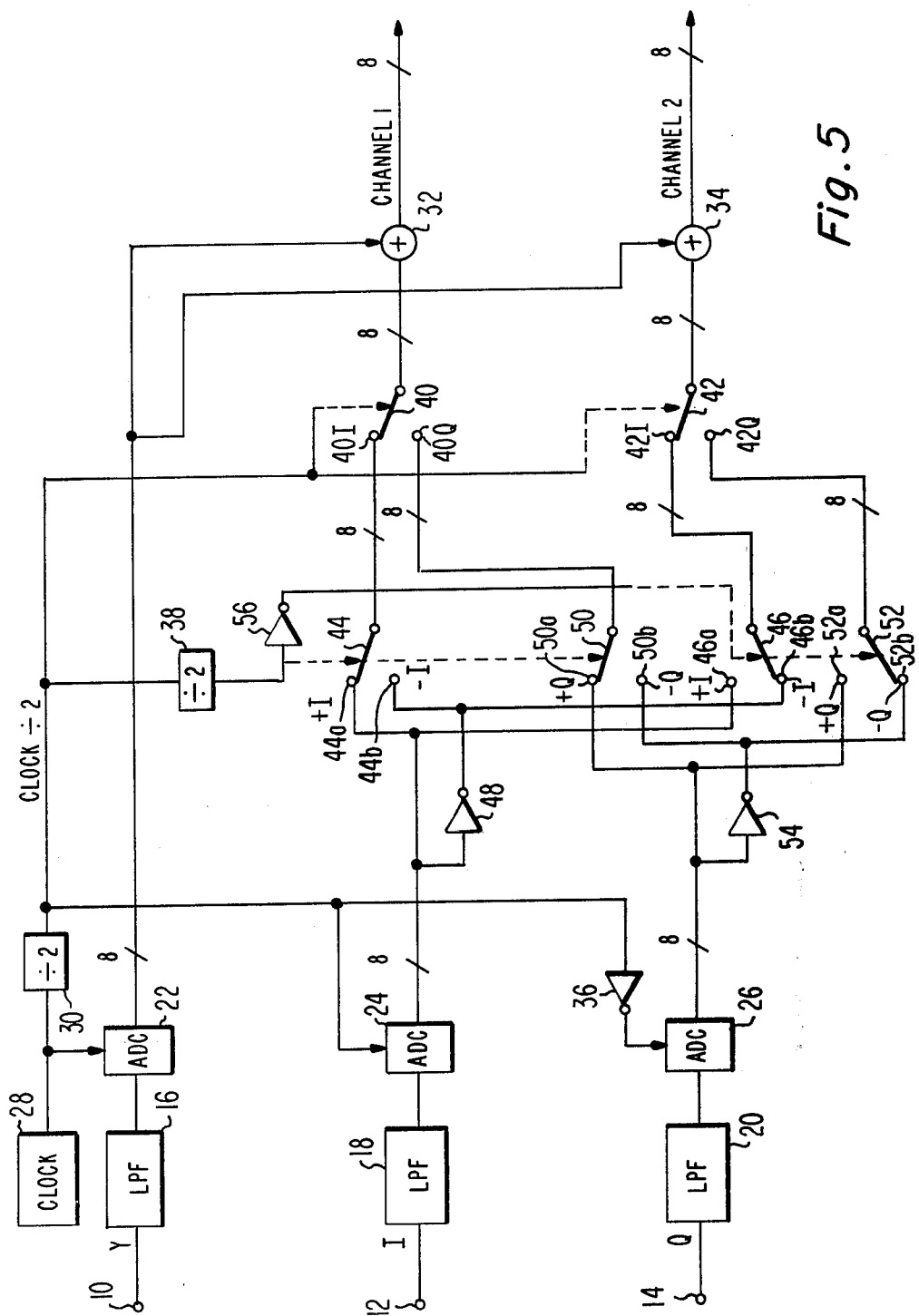
FIG. 5 is a block diagram of an encoder in accordance with the present invention.

FIG. 2 shows pixels (picture elements) that result when an NTSC composite color television signal is sampled at a frequency equal to four times the color subcarrier frequency. By preselecting the phase of the sampling signal, the first pixel comprises Y and I components, the second pixel comprises Y and Q components, the third pixel comprises Y-I components, the fourth pixel comprises Y-I components, the fifth pixel having the same components and phase as the first pixel, etc. The abovedescribed pattern is determined by the fact that the I and Q components are phase displaced 90 degrees relative to each other and that sampling occurs every 90 degrees of the color subcarrier if the sampling frequency is four times the color subcarrier frequency.

FIG. 3 shows a recording format in accordance with the invention. Pixels, such as shown in FIG. 2, are recorded in two channels. The two channels can be two different tracks on a magnetic tape or a different embodiment described below in conjunction with FIG. 4. A pixel in channel 1 is depicted using an "X" while a pixel in channel 2 is depicted using "0". It will be noted in FIG. 3 that the phase of the I and Q cosited (derived from the same position of a scanning raster) component signals in the two channels are opposite.

If both channels are present upon playback, i.e. no dropout occurs, then the cosited pixels from the two channels are both added to and subtracted from each other to provide two output signals. For example, if the Y+I pixel No. 1 of channel 1 is added to the Y−I pixel No. 1 of channel No. 2, the result is a 2Y output signal, since the Y components add, while the I components cancel each other. The result is increased effective dynamic range for the Y output signal without an increase in the number of quantizing levels required in the original digitizing of the television signal. Similarly, if the Y+I pixel No. 1 of channel 1 is also subtracted from the Y−I pixel of No. 1 of channel No. 2, the result is a 2I signal, since the I components add, while the Y components cancel each other. The result is increased dynamic range for the I output signal. The same addition and subtraction process is used with pixels No. 2 of both channels with the same result except that the separated output signals are Y and Q. The remaining cosited pixels are also added and subtracted with the result that the Y, I and Q signals are reproduced with improved dynamic range.

If a dropout occurs in one of the channels, then the same addition and subtraction process is used except that it is done with semi-adjacent pixels in the remaining channel. For example, if channel 2 drops out, pixels Nos. 1 and 3 of channel 1 are added to produce a 2Y output signal, since the I components cancel if they are exactly the same, which is true except if a color transition occurs between pixels Nos. 1 and 3, which is rare. Similarly, pixels Nos. 1 and 3 are subtracted to produce a 2I output signal, since the Y components cancel unless there is a luminance transition between pixels Nos. 1 and 3, which again is rare. If there is a transition in the picture signal, the addition and subtraction processes will not produce pure I, Y and Q signals since the components of the pixels are not strictly equal. However, the separation of luminance and chrominance is at least approximate, thereby providing a more pleasing picture than the prior art. The same addition and subtraction process is used with pixels Nos. 2 and 4 of channel 1 to produce Y and Q output signals in the event of a dropout of channel 2. The process is repeated for pixels Nos. 3 and 5, 4 and 6, etc. Since one of the input signals used in the adding and subtracting processes contains the same information as the cosited pixel that has dropped out in the other channel, the resulting output signals of said processes can have greater than one half the resolution of the original picture during the dropout interval. In a typical prior art system, both of the input signals for the concealment process are derived from pixels totally other than the dropped out pixel, and therefore the resulting output signal has at most one-half the resolution of the original picture.

Obviously, if the dropout occurs in channel 1, then the identical process is used with the pixels of channel 2.

FIG. 4 shows another possible embodiment of a recording format suitable for the invention. Here the pixels of channel 2, again depicted by an O, are time multiplexed recorded in a single track with a delay of 1H (one horizontal line) with respect to the pixels of channel 1. The same adding and subtracting process described above is used in this embodiment except that the pixels of channel 1 must first be delayed by 1H so they are in time synchronization with the corresponding pixels of channel 2.

FIG. 5 shows a block diagram of an encoder in accordance with the present invention. Input terminals 10, 12, and 14 respectively receive analog Y, I, and Q signals from a source such as a television camera. If these signals are not available as such, they can be obtained by matrixing the R, G, and B signals that are provided by the three camera imagers, as is known in the art. The Y, I, and Q signals are applied to the inputs of antialiasing LPFs (low pass filters) 16, 18 and 20 respectively, which LPFs typically have cut-off frequencies of 4.2, 1.5, and 0.6 MHz respectively, but in no event are the cut-off frequencies greater than one half the respective sampling frequencies described below. The output signals of LPFs 16, 18, and 20 are applied to ADCs (analog to digital converters) 22, 24 and 26 respectively.

Clock signal generator 28 provides a square wave sampling signal at four times the color subcarrier (4XSC) frequency, e.g., 14.32 MHz for NTSC, to ADC 22 and also to divide-by-two frequency divider 30. Thus the Y signal is digitized at 4XSC rate by ADC 22, which provides an 8-bit parallel output signal to 8-bit adders (each 8-bit adder having 8 adders, one for each bit) 32 and 34. The twice color subcarrier (2XSC) frequency signal from the output of divider 30 is applied directly to ADC 24, through inverter 36 to ADC 26, to divide by two frequency divider 38, and as a control signal to 8-bit double-throw switches (each switch comprising 8 poles, one for each bit) 40 and 42, (the control function being shown by dotted lines). The I signal is thus digitized at twice the subcarrier frequency by ADC 24, which provides an 8-bit output signal, called "I" to contact 44a of 8-bit switch 44, to contact 46a of 8-bit switch 46, and to 8-bit inverter (8 inverters, one for each bit) 48. The output signal from inverter 48, called "−I", is applied to contact 44b of switch 44 and to contact 46b of switch 46. The Q signal is digitized at twice the subcarrier frequency by ADC 26, although with a one cycle phase shift at the four times subcarrier frequency as compared to the digitization of the I signal due to the inverter 36. This is to obtain the I, Q, I, Q, etc. pattern for both channels as shown in FIG. 3. ADC 26 provides an 8-bit output signal, called "+Q", that is applied to contact 50a of 8-bit switch 50, and to contact 52a of 8-bit switch 52. The signal from inverter 54, called "−Q", is applied to contacts 50b and 52b of switches 50 and 52 respectively.

The output signal from divider 38 has the subcarrier frequency and is directly applied to control (as indicated by a dotted line) switches 44 and 50, and indirectly applied through inverter 56 to control switches 46 and 52. Because of said inverter 56, and as shown in FIG. 5, when switches 44 and 50 are in their upper position contacting contacts 44a and 50a respectively, switches 46 and 52 are in their lower position contacting contacts 46b and 52b respectively. Conversely, when switches 44 and 50 are in their lower positions contacting contacts 44b and 50b respectively, switches 46 and 52 are in their upper positions contacting contacts 44a and 50a respectively. Thus switch 44 supplies a $+I, -I, +I, -I$, etc. signal sequence to contact 40I of switch 40, while switch 50 supplies a $+Q, -Q, +Q, -Q$ etc. signal sequence to contact 40Q thereof. Since switch 40 is alternating at twice the rate of switches 44 and 50, and due to the phase shift caused by inverter 36, the above described sequences interleave, and thus the output signal sequence of switch 40 is $+I, +Q, -I, -Q, +I, +Q, -I, -Q$, etc. The output signal from switch 40 is applied to adder 32 where the Y signal from ADC 22 is added to it to produce the channel 1 signal sequence $Y+I, Y+Q, Y-I, Y-Q$, etc. as shown in FIG. 3.

Similarly, switch 46 supplies a $-I, +I, -I, +I$, etc. signal sequence to contact 42I of switch 42, while switch 52 supplies a $-Q, +Q, -Q, +Q$, etc. signal sequence to contact 42Q thereof. The output signal sequence of switch 42 is thus $-I, -Q, +I, +Q, -I, -Q, +I, +Q$, etc. and the output signal is applied to adder 34 where it is added to the Y signal from ADC 22 to produce the channel 2 sequency $Y-I, Y-Q, Y+I, Y+Q$, etc.

The 8-bit output signals from adders 32 and 34 are applied to a transmission path which may include recording circuitry (not shown) of known construction, e.g. a 16 track recorder (8 tracks for each channel) or to a system for recording the 8 bits of each channel serially in two tracks using delay lines. The signals can be either direct or FM recorded.

Figure 6:
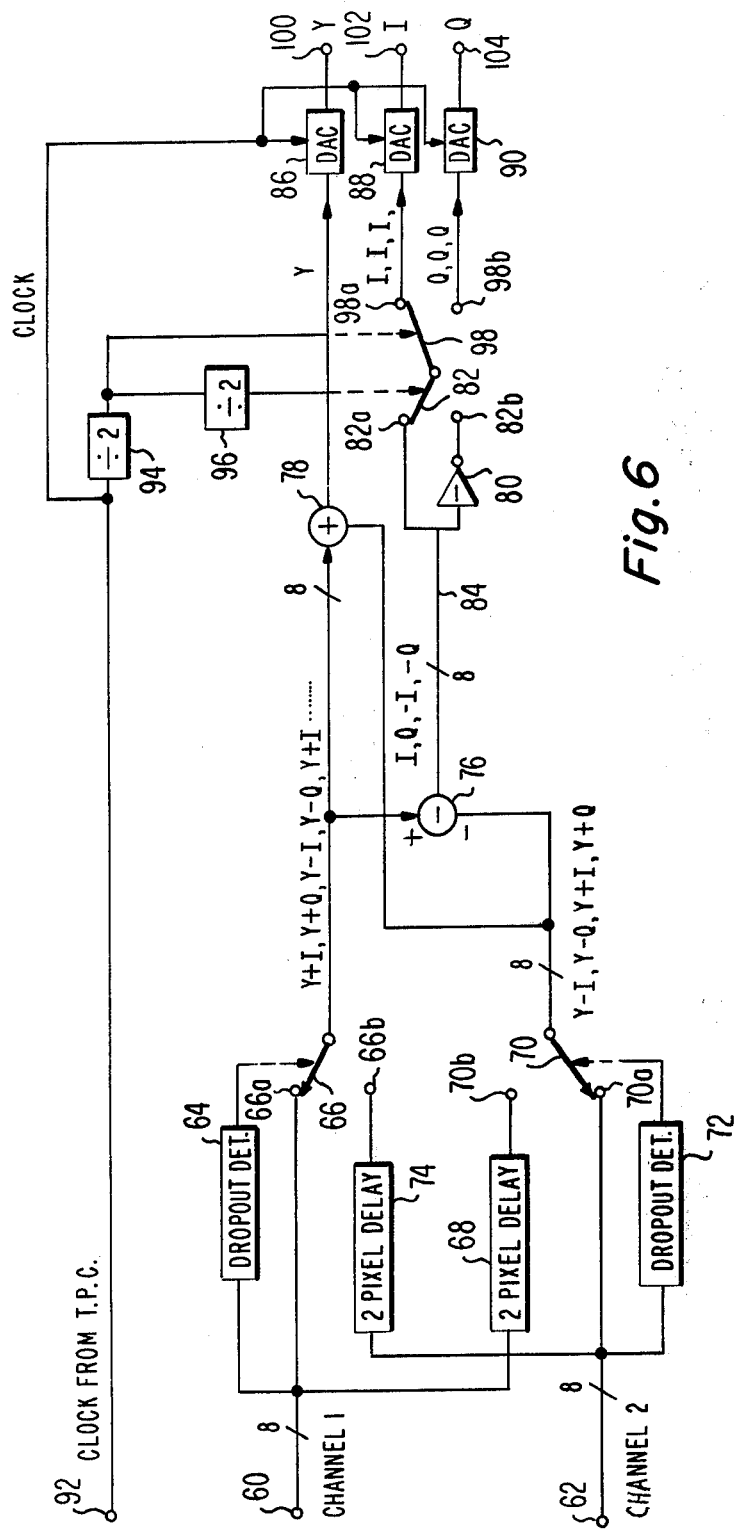
FIG. 6 is a block diagram of a decoder in accordance with the present invention.

FIG. 6 shows an embodiment of a decoder in accordance with the present invention. Input terminals 60 and 62 receive the channel 1 and 2 signals respectively from magnetic recording playback apparatus (not shown) or another transmission path. The channel 1 signal present at terminal 60 is directly applied to terminal 66a of 8-bit switch 66, to a dropout detector 64, the output of which detector 64 controls switch 66, and to a 2 pixel long 8-bit delay line (8 delay lines, one for each bit) 68, the output of which delay line 68 is coupled to contact 70b of 8-bit switch 70. For NSTC digitized at 4XSC, delay line 68 has a delay of about 140 nanoseconds. Similarly, the channel 2 signal at terminal 62 is directly applied to terminal 70a of switch 70, to a dropout detector 72, the output of which detector controls switch 70, and to a 2-pixel-long 8-bit delay line 74, the output of which delay line 74 is coupled to contact 66b of switch 66. Dropout detectors 64 and 72 are known in the art. For example, if phase change recording is used for each pixel, then lack of a phase change when one should occur indicates a dropout.

If no dropout is detected then switches 66 and 70 are in the positions as shown in FIG. 6, the channel 1 signal at terminal 60 is applied to the positive input of 8-bit subtractor (8 subtractors, one for each bit) 76 and to a first input of 8-bit adder 78, while the channel 2 signal at terminal 62 is applied to the subtracting input of subtractor 76 and to the second input of adder 78. Thus correspondingly numbered pixels of channels 1 and 2 as shown in FIG. 3 are subtracted from each other to provide the output signal of subtractor 76, e.g. $(Y+I)-(Y-I)=+2I$, $(Y+Q)-(Y-Q)=+2Q$, $(Y-I)-(Y+I)=-2I$, $(Y-Q)-(Y+Q)=-2Q$, etc. The addition of the I+Q signals from the two channels provides increased effective dynamic range as explained above.

The output signal from subtractor 76 on bus 84 is applied to 8-bit inverter 80 and to contact 82a of 8-bit switch 82. Adder 78 adds the cosited signals from switches 66 and 70 to provide the Y signal to DAC (digital to analog converter) 86, e.g. $(Y+I)+(Y-I)=2Y$, $(Y+Q)+(Y-Q)=2Y$, $(Y-I)+(Y+I)=2Y$, $(Y-Q)+(+Q)=2Y$, etc.

A TBC (time base corrector) is normally used during playback of a video tape recorder to remove jitter. To achieve this, the TBC generates a clock signal that has the same frequency and phase as the reproduced and dejittered pixels that occur at the four times subcarrier frequency. This clock signal is received at input terminal 92 and applied to divide-by-two frequency divider 94 as well as to DACs 86, 88 and 90 as a clock signal. The 2XSC output signal from divider 94 is applied to divide-by-two frequency divider 96 and as a control signal to switch 98. The subcarrier frequency output signal from divider 96 controls the position of switch 82.

For pixel No. 1, switches 82 and 98 are in the positions shown in FIG. 6, i.e., contacting contacts 82a and 98a respectively. Thus a positive sign I pixel from subtractor 76 is applied to DAC 88. For pixel No. 2 switch 98 contacts contact 98b, and thus a positive sign Q pixel from subtractor 76 is applied to DAC 90. For pixel Nos. 3 and 4 switch 82 contacts contact 82b, and thus these negative signed pixels are sign inverted by inverter 80 to produce positive signed pixels for application to switch 98. For pixel No. 3 switch 98 contacts contact 98a to provide the now positive signed I pixel to DAC 88, while for pixel No. 4 switch 98 contacts contact 98b to provide a now positive signed Q pixel to DAC 90. For pixel No. 5 the positions of switches 82 and 98 are the same as explained above for pixel No. 1. Thus only I and Q pixels having the same sign are applied to DACs 88 and 90 respectively. DACs 86, 88 and 90 provide analog Y, I, and Q signals respectively to output terminals 100, 102, and 104 respectively. If desired, the signals at terminals 101, 102, and 104 can be matrixed to provide R, G, and B signals for application to a display device as is known in the art.

If a dropout occurs in channel 2 during pixel No. 3, then dropout detector 72 causes switch 70 to engage contact 70b, and thus switch 70 will provide pixel No. 1 of channel 1 as its output signal due to the two pixel delay of delay line 68 having an input coupled to channel 1. It will be seen in FIG. 3 that pixel No. 1 of channel 1 and pixel No. 3 of channel 2 are both of the form (Y+I). Thus the signal processing sequence in the decoder of FIG. 6 need not be changed. It will be further appreciated that since, as will be seen in FIG. 3, the form of any selected pixel number in channel 2 is the same as that of a pixel occuring in channel 1 two pixels prior to said selected pixel, the dropout correction works for any selected pixel number. If a dropout occurs in channel 2, then dropout detector 64 causes switch 66 to engage contact 66b, and thus switch 66 will provide at its output a two pixel delayed signal from channel 2 through delay line 74. Again, FIG. 3 shows that the dropped out pixel and the substitute pixel are of the same form, thus making the substitution possible.

Due to the choice of the sampling frequency, the sequence of the pixels will repeat every two frames. During editing it may be desired to change frames for splicing. In order to be able to splice, it may be necessary to interchange the channel 1 and 2 signals to inputs 60 and 62 to preserve the pixel sequence.

It will be appreciated that many other embodiments are possible within the spirit and scope of the invention. For example, the signals used in the example given above Y+Q, Y+I, Y−Q, and Y−I, form a separable set of colors, i.e. by combining them together in the proper manner given above, components such as Y, I, and Q, are obtained.

In general, any set of separable components can be used with the present invention provided they are separable both within any one channel (to allow at least approximate separation into color components when only one channel is available due to dropouts) and between any one channel and at least one remaining channel (to allow complete color separation when all channels are available). In order to be separable within any one channel, the pixels within that channel must comprise a series of cyclical combinations of components, each pixel comprising cosited components. To be separable between channels cosited pixels must have a different combination of components.

What is claimed is:

1. A method of transmitting samples of a color television signal, said method comprising sequentially transmitting in each of a plurality of channels a separable set of color component s of each sample of said television signal, samples in any one channel being cosited with respect to corresponding samples in the remaining channel or channels, any one channel of said plurality being separable with respect to the remaining channel or channels, whereby at least approximate separation into color components is possible when only one channel is available due to dropouts, and complete color separation is possible when all channels are available.

2. A method as claimed in claim 1, wherein said separable set comprises color difference components and said transmitting step comprises transmitting said color difference components summed with a luminance component.

3. A method as claimed in claim 2, wherein said color difference components comprise I and Q signals.

4. A method as claimed in claim 2, wherein said plurality comprises two, and said color difference components comprise first and second signals, and said transmitting step comprises transmitting in each of said channels the sum of said luminance component and alternating ones of said first and second color difference component signals, the phase of said color difference signals in each said channels alternating every two samples, the phase of cosited ones of said color difference signals in different channels being opposite with respect to each other.

5. A method of receiving samples of a color television signal sequentially transmitted in each of a plurality of channels using a separable set of color components of each sample of said television signal, samples in any one channel being cosited with respect to corresponding samples in the remaining channel or channels, any one channel of said plurality being color separable with respect to the remaining channel or channels, said method comprising completely separating said components when all channels are available, and at least approximately separating said components from one channel when the remaining channel or channels has dropped out.

6. A method as claimed in claim 5, wherein said completely separating step comprises adding and subtracting cosited samples in said channels, and said at least approximately separating step comprises adding and subtracting samples in the same channel.

7. An apparatus for transmitting samples of a color television signal, said apparatus comprising transmitting means for sequentially transmitting in each of a plurality of channels a separable set of color components of each sample of said television signal, samples in any one channel being cosited with respect to corresponding samples in the remaining channel or channels, any one channel of said plurality being color separable with respect to the remaining channel or channels, whereby at least approximate separation into color components is possible when only one channel is available due to dropouts, and complete color separation is possible when all channels are available.

8. An apparatus as claimed in claim 7, wherein said separable set comprises color difference components and said transmitting means transmits said color difference components summed with a luminance component.

9. An apparatus as claimed in claim 8, wherein said color difference components comprise I and Q signals.

10. An apparatus as claimed in claim 8, wherein said plurality comprises two, and said color difference components comprise first and second signals and said transmitting means transmits in each of said channels the sum of said luminance component and alternating ones of said first and second color difference component signals, the phase of said color difference signals in each said channels alternating every two samples, the phase of cosited ones of said color difference signals in different channels being opposite with respect to each other.

11. An apparatus as claimed in claim 7, wherein said channels comprise tracks on magnetic tape.

12. An apparatus for receiving samples of a color television signal sequentially transmitted in each of a plurality of channels using a separable set of color components of each sample of said television signal, samples in any one channel being cosited with respect to corresponding samples in the remaining channel or channels, any one channel of said plurality being color separable with respect to the remaining channel or channels, said apparatus comprising means for completely separating said components when all channels are available, and means for at least approximately separating said components from one channel when the remaining channel or channels has dropped out.

13. An apparatus as claimed in claim 12, wherein said completely separating means comprises means for adding and subtracting cosited samples in said channels, and said at least approximately separating means comprises means for adding and subtracting samples in the same channel.

* * * * *